United States Patent
Hess et al.

(12)

(10) Patent No.: US 6,235,852 B1
(45) Date of Patent: May 22, 2001

(54) OPTIMIZATION OF A COOLING WATER SYSTEM OF A POLYOLEFIN PRODUCTION UNIT

(75) Inventors: Jürgen Hess, Hofheim; Matthias Stumpf, Wiesbaden, both of (DE)

(73) Assignee: Aventis Research & Technologies GmbH & Co KG (DE)

( * ) Notice: Subject to any disclaimer, the term of this patent is extended or adjusted under 35 U.S.C. 154(b) by 0 days.

(21) Appl. No.: 09/331,816

(22) PCT Filed: Oct. 20, 1997

(86) PCT No.: PCT/EP97/05775

§ 371 Date: Jun. 25, 1999

§ 102(e) Date: Jun. 25, 1999

(87) PCT Pub. No.: WO98/29185

PCT Pub. Date: Jul. 9, 1998

(30) Foreign Application Priority Data

Dec. 31, 1996 (DE) .............................. 196 54 806

(51) Int. Cl.⁷ ..................................................... C08F 2/04
(52) U.S. Cl. ................. 526/65; 62/179; 62/185; 62/201; 165/65
(58) Field of Search .................. 526/65; 62/179, 62/185, 201; 165/65

(56) References Cited

U.S. PATENT DOCUMENTS 4,744,408 * 5/1988 Pearson et al. ..................... 165/2

FOREIGN PATENT DOCUMENTS 1149006   5/1963   (DE) .
1503642   10/1967  (FR) .

* cited by examiner

*Primary Examiner*—David W. Wu
*Assistant Examiner*—W. Cheung
(74) *Attorney, Agent, or Firm*—Connolly Bove Lodge & Hutz LLP

(57) ABSTRACT

The invention relates to a process for cooling polymerization reactors in the preparation of polyolefins, the polymerization being carried out in a first reactor and in at least one further reactor, the further reactor or reactors being connected downstream of the first reactor and each being cooled by an internal cooling circuit in which a cooling medium circulates. The invention comprises feeding cooling medium from the cooling circuit (9) of the first reactor (1) into the cooling circuit (10) of at least one further reactor (2) and taking off the same amount of cooling medium from the cooling circuit (10) of this reactor (2), cooling it and recirculating it into the cooling circuit (9) of the first reactor (1).

5 Claims, 3 Drawing Sheets

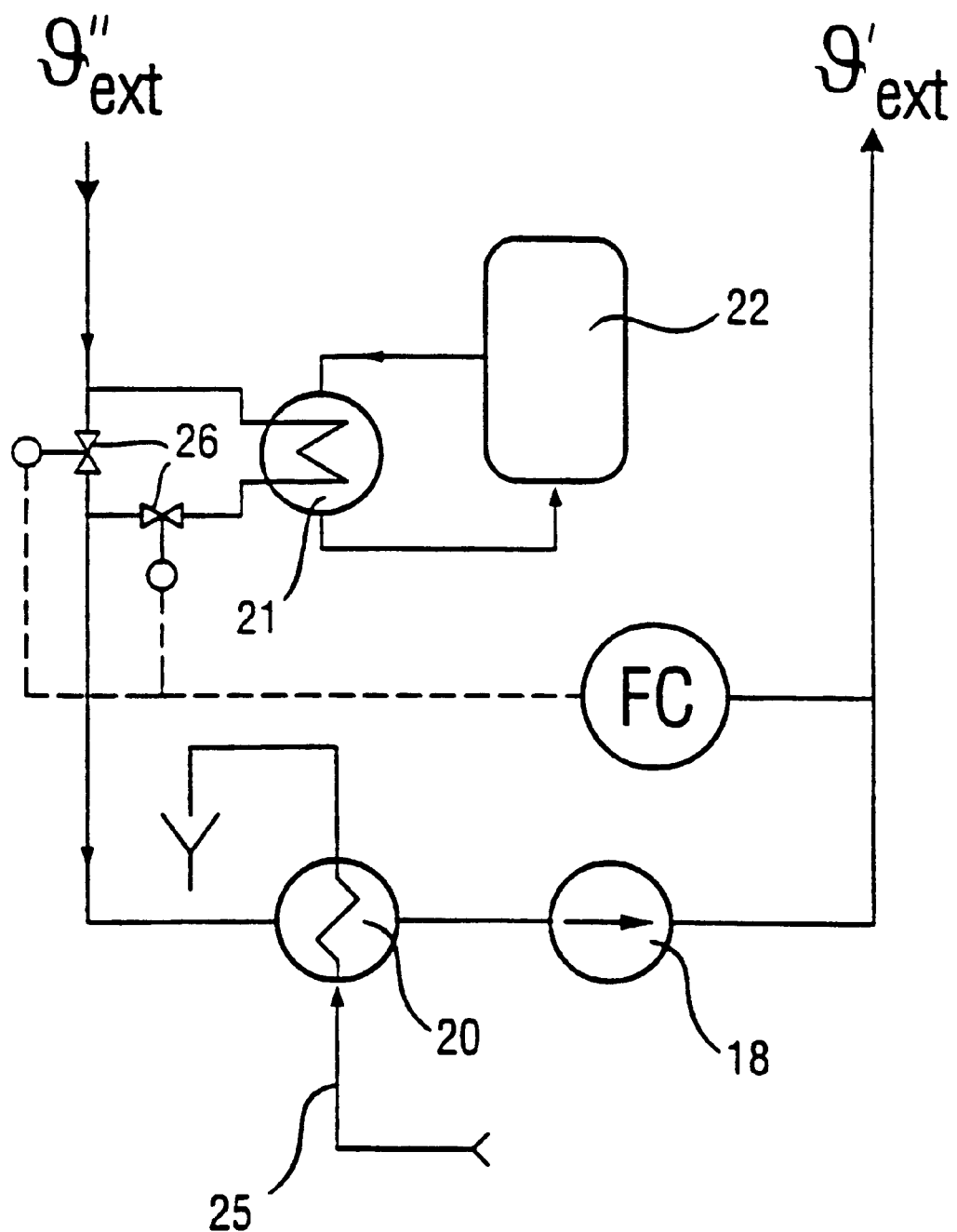

OPTIMIZATION OF A COOLING WATER SYSTEM OF A POLYOLEFIN PRODUCTION UNIT

Figure 1:
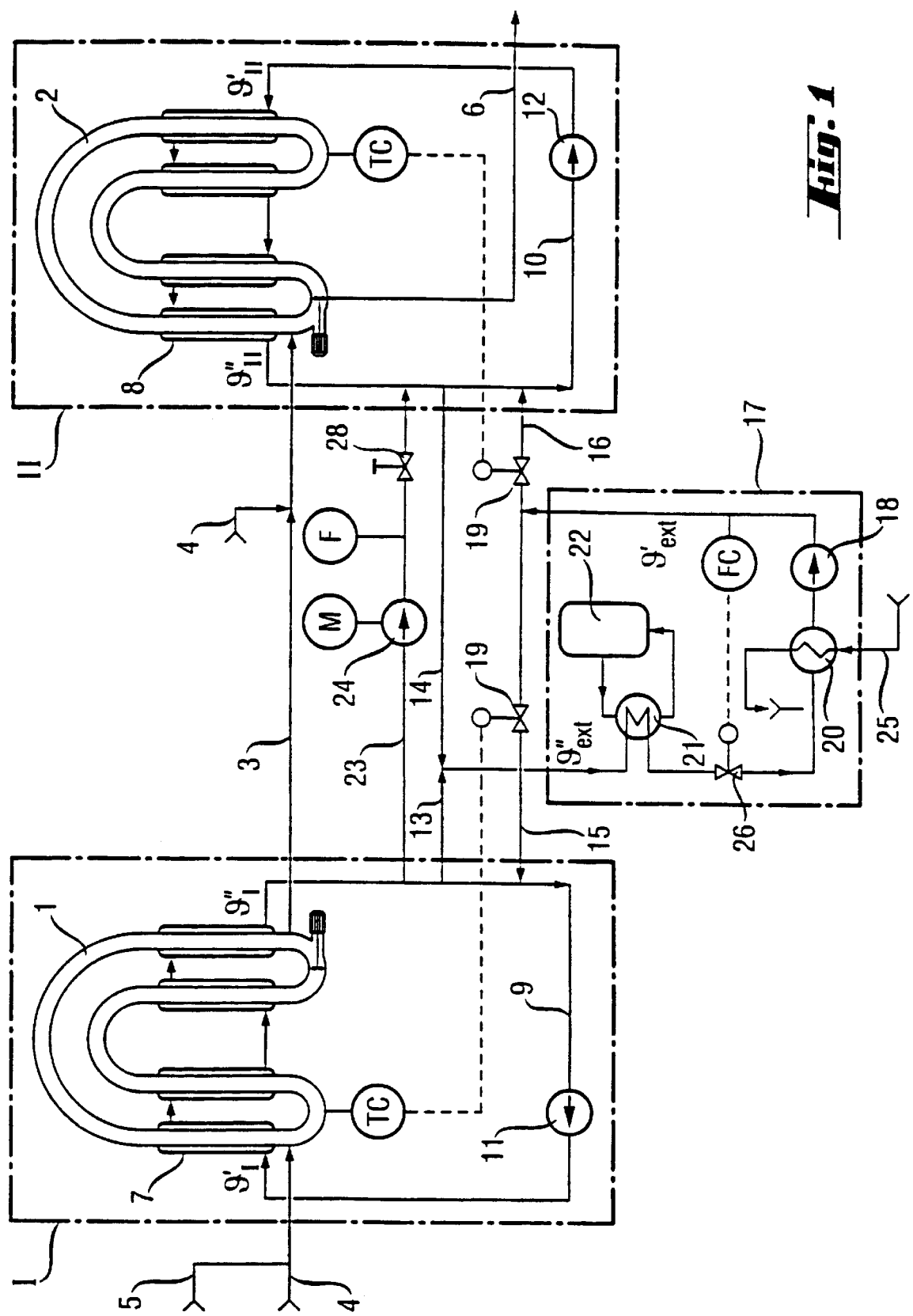

The invention relates to a process for cooling polymerization reactors in the preparation of polyolefins, the polymerization being carried out in a first reactor and in at least one further reactor, the further reactor or reactors being connected downstream of the first reactor and each being cooled by an internal cooling circuit in which a cooling medium circulates.

Processes of said type are disclosed, for example, by SRI International Report No. 128A, Menlo Park, Calf., USA 1993, in which the ®Spheripol process for preparing polypropylene is described. According to this, olefins can be converted to polyolefins in an exothermic reaction under pressure and in the presence of a catalyst at temperatures between 70 and 85° C. (e.g. HDPE). In what is termed the liquid-phase processes, the monomer here frequently serves as suspension medium for the polymer. As polymerization reactors, use is preferably made of loop reactors in modern high-performance production units, owing to the favorable surface/volume ratio. The exothermic heat of reaction is given off to an internal cooling water circuit via the heat-exchange surfaces of the reactors. The internal circuit is cooled by adding colder water. Accordingly, the same amount of water, which is then heated by the heat of reaction, must be removed from the internal cooling circuit. Usually, the water is fed to and removed from the internal cooling circuits as what is termed "cycle water" via an external cooling circuit. In this external cooling circuit, the heat of reaction taken up by the cycle water is given off to heat consumers in the process and, via heat-exchange surfaces, to external cooling water, e.g. the works recooling water, to reach the low flow temperature required for the reactors.

For broad variation of product properties, frequently, two or more reactors are operated on the product side in cascade (connected one after the other); on the water side they are operated in parallel. Although water-side cascade operation is known per se, it is not employed in the known processes, since it is expected that with identical reactions in identical vessels, the cooling water inlet temperatures would have to be identical, furthermore, there would here be the risk that temperature fluctuations in the reactor are transmitted to the second reactor or the following reactors.

It has now surprisingly been found that, apparently due to an aging behavior of the catalyst, in the second reactor and in each further reactor, the reaction conversion rate decreases and that therefore the following previously unnoticed effects occur: owing to this aging behavior, in the first reactor, significantly more heat of reaction needs to be removed than in the following reactors. If the heat-exchange surfaces of the reactors are about equal in size, then, at the same flow temperature $\theta'_{ext}$ of the external cooling water— significantly more cooling water must be pumped into the internal circuit of the reactor I then into that of reactor II, reactor III, etc. In addition, the water inlet temperature $\theta_1'$ and water outlet temperature $\theta_1''$ of the reactor I are lower than for the following reactors. With increasing production rate, the water inlet temperature $\theta'$ and outlet temperature $\theta''$ then decrease for all the reactors, while the feed rate of external water increases—particularly for reactor I.

Since the water inlet and outlet temperatures $\theta'$, $\theta''$ of the reactors must fall with increasing plant throughputs if more heat is to be transferred, under otherwise identical conditions, either both the temperature $\theta'_{ext}$ of the external cooling circuit must be reduced and its water flow rate $F_{ext}$ must be increased and/or the cooling water rate flowing from the external cooling circuit to the individual reactor must be increased. The return flow temperature $\theta''_{ext}$ of the external cooling water likewise decreases with increasing plant throughputs.

Flow temperature $\theta'_{ext}$ setting is dependent on the process-internal heat utilization and on the temperature of the external cooling water. This means that: in the summer months, when the temperatures of the external cooling water (e.g. river water or recooling water) increase, the plant capacity must be reduced.

The temperature level of the backflow of the external cooling circuit becomes too low for process-internal heat consumers with increasing plant throughputs. Increasing the external water flow rate is limited, for example by the maximum circulation rates of the two internal circuits.

Owing to these disadvantages, the capacity of a polyolefin production unit cannot be utilized completely.

The object therefore underlying the invention is to improve the process mentioned at the outset in such a manner that these advantages are abolished.

The object is achieved by an inventive process of the type mentioned at the outset, which process comprises feeding cooling medium from the cooling circuit of the first reactor into the cooling circuit of at least one further reactor and taking off the same amount of cooling medium from the cooling circuit of this reactor, cooling it and recirculating it to the cooling circuit of the first reactor.

The invention thus relates to a process for cooling polymerization reactors in the preparation of polyolefins, the polymerization being carried out in a first reactor and in at least one further reactor, the further reactor or reactors being connected downstream of the first reactor and each being cooled by an internal cooling circuit in which a cooling medium circulates, which comprises cooling medium being fed from the cooling circuit of the first reactor into the cooling circuit of at least one further reactor and the same amount of cooling medium being taken off from the cooling circuit of this reactor, cooled and recirculated into the cooling circuit of the first reactor.

In a preferred embodiment, the feed takes place under temperature or flow rate control, the setpoint value being preset on the basis of a temperature or a wanted flow rate. As cooling medium, use is preferably made of water. The cooling medium can be cooled in an external cooling circuit which itself can be cooled with cooling water directly or indirectly. The temperatures of the cooling media in the individual cooling circuits are preferably in the ranges from 30 to 80° C. (cooling circuit of the first reactor), from 30 to 80° C. (cooling circuits of the further reactors) and from 20 to 40° C. (external cooling circuit).

The invention further relates to an apparatus for carrying out this process, and to a process for preparing polyolefins, in particular polypropylene.

The process according to the invention is described in more detail below with reference to a possible embodiment which is shown in the drawing as a process flow chart.

Two polymerization reactors, reactor I 1 and reactor II 2 are connected to one another via a pipe 3. The monomer, other additives and the catalyst pass via feeds 4, 5 into the reactor I 1, in which the polymerization is started, from there, together with the polymer formed, via the pipe 3 into the reactor II 2 in which the polymerization advances further and from the reactor II 2 through an outlet 6 to a further reactor or for further processing. However, the reaction can also be started in an upstream so-called start reactor (babyloop). The two reactors I 1, II 2 are equipped with cooling jackets 7, 8 which are integrated into internal cooling circuits I 9, II 10 and in which a cooling medium circulates by means of pumps 11, 12. The two internal cooling circuits I 9, II 10 are connected via pipes 13, 14, 15, 16 to an external cooling circuit 17, via which cooled cooling medium can be fed at a flow temperature $\theta'_{ext}$ using a pump 18 and controllable valves 19 into the internal cooling circuits I 9, II 10. The external cooling circuit comprises heat exchangers 20, 21 via which heat of reaction can be given off to a consumer 22 or can be removed from the system by external cooling water 25. In accordance with the invention, the internal cooling circuit I 9 is connected via a pipe 23 and a pump 24 to the internal cooling circuit II 10. According to the invention, cooling medium from the circuit I 9 is fed into the circuit II 10 by the pump 24. The same amount can be taken off from the circuit II 10 via the line 14. It can then be cooled in an external circuit 17 and fed back to the circuit I 9 via the line 15.

Figure 2:
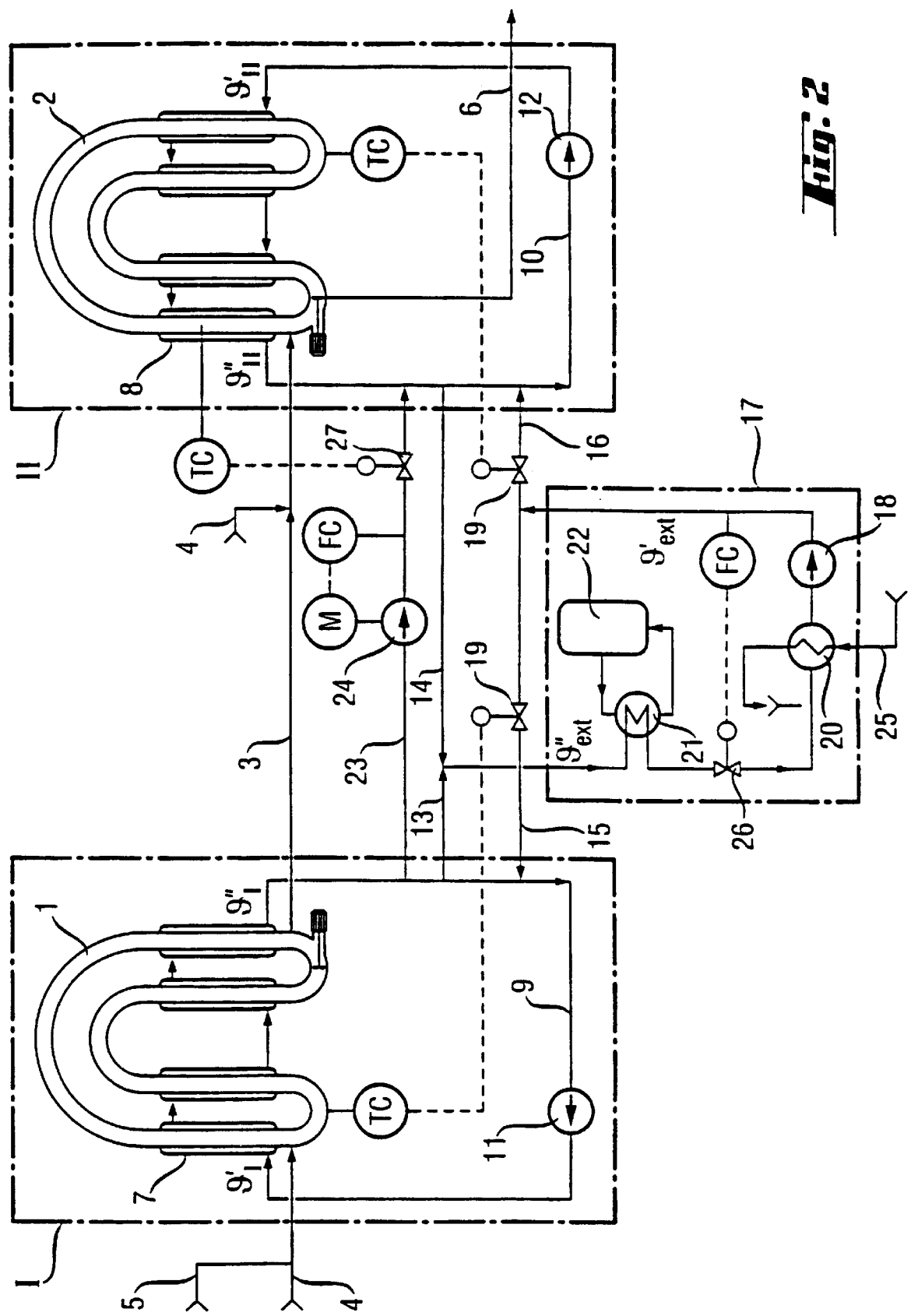

As shown in FIG. 2, the feed can be performed under flow control (M—FC) or temperature control (control valve 27 in association with temperature controller TC).

FIG. 3 shows one possible method of connecting or shutting off the consumer 22 in the external cooling circuit by means of control valves 26.

The return flow temperature $\theta'_{ext}$ of the external cooling circuit is determined by the water flow rate and the required low temperature $\theta''_I$ of the internal cooling circuit I 9. If the outlet temperature of the internal cooling circuit I 9 $\theta''_I$ is lower than the inlet temperature $\theta'_{II}$ of the internal cooling circuit II 10 into the double jacket of the reactor II, the water from the circuit I 9 can be used for removing the entire heat of reaction from the reactor II 2.

The heated water exiting from the internal cooling circuit I 9 of the reactor I 2 is transferred to the internal cooling circuit 10 of the reactor II 2 in accordance with the refrigeration need. As a result, the flow rate of the water exiting from the internal circuit 10 of the reactor II 2, which water, owing to the lower production rate in the reactor II 2, has a higher temperature $\theta''_{II}$, increases. The exit temperature $\theta''_{II}$ remains unchanged, even at the higher outlet flow rate.

The process according to the invention essentially offers the following advantages: If the circulation rate $F_{ext}$ of the external cooling circuit is kept constant, at the same flow temperature $\theta'_{ext}$, a higher production rate can be achieved. At the same production rate, the circulation rate $F_{ext}$ in the external circuit can be decreased. At the same production rate, if the circulation rate $F_{ext}$ is maintained, the flow temperature of the external cycle water $\theta'_{ext}$ can be increased, for example from 30° C. to a little less than 35° C. This also increases the return flow temperature $\theta'_{ext}$ of the external cycle water. The higher temperature level of the external cooling circuit simplifies the utilization of heat for process-internal consumers or enables a greater process-internal utilization of the heat of reaction. In addition, the higher temperature level facilitates heat exchange with external cooling water.

The cooling process according to the invention is not restricted to the preparation of polyolefins, preferably polyethylene or polypropylene, but is suitable in principle for cooling heat sources which require variable inlet temperatures for the cooling medium in their cooling circuits.

What is claimed is:

1. A process for cooling polymerization reactors in the preparation of polyolefins, the polymerization being carried out in a first reactor and in at least one further reactor, the further reactor or reactors being connected downstream of the first reactor and each being cooled by an internal cooling circuit in which a cooling medium circulates, which comprises cooling medium being fed from the cooling circuit of the first reactor into the cooling circuit of the at least one further reactor and the same amount of cooling medium being taken off from the cooling circuit of the at least one further reactor, cooled and recirculated into the cooling circuit of the first reactor.

2. The process as claimed in claim 1, wherein the feed is performed under temperature or flow rate control.

3. The process as claimed in claim 1, wherein the cooling medium is water.

4. A process for preparing polyolefins in which the polymerization is carried out in a first reactor and at least in one further reactor, the further reactor or reactors being connected downstream of the first reactor and each being cooled via an internal cooling circuit in which a cooling medium circulates, which comprises cooling medium being fed from the cooling circuit of the first reactor into the cooling circuit of the at least one further reactor and the same amount of cooling medium being taken off from the cooling circuit of the at least one further reactor, cooled and recirculated into the cooling circuit of the first reactor.

5. The process as claimed in claim 4, wherein the polyolefin is polypropylene.

* * * * *

UNITED STATES PATENT AND TRADEMARK OFFICE
CERTIFICATE OF CORRECTION

PATENT NO. : 6,235,852 B1
DATED : May 22, 2001
INVENTOR(S) : Jürgen Hess and Matthias Stumpf It is certified that error appears in the above-identified patent and that said Letters Patent is hereby corrected as shown below:

Column 4,
Line 4, "$\theta'_{ext}$" should read -- $\theta''_{ext}$ --.

Signed and Sealed this

Eighth Day of January, 2002

*Attest:*

JAMES E. ROGAN
*Attesting Officer*     *Director of the United States Patent and Trademark Office*